US008814377B2

(12) United States Patent
Kim et al.

(10) Patent No.: US 8,814,377 B2
(45) Date of Patent: Aug. 26, 2014

(54) BACKLIGHT UNIT AND DISPLAY APPARATUS USING THE SAME

(75) Inventors: Min Sang Kim, Seoul (KR); Duk Hyun Yun, Seoul (KR); Moon Jeong Kim, Seoul (KR); Jung In Seo, Seoul (KR); Jeong Hwan Kim, Seoul (KR); Ji Won Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/213,216

(22) Filed: Aug. 19, 2011

(65) Prior Publication Data

US 2011/0305004 A1 Dec. 15, 2011

(30) Foreign Application Priority Data

Nov. 2, 2010 (KR) .................. 10-2010-0108139

(51) Int. Cl.
*G09F 13/04* (2006.01)
*F21V 7/04* (2006.01)

(52) U.S. Cl.
USPC .......... 362/97.3; 362/607; 362/623; 362/624; 362/625; 362/627

(58) Field of Classification Search
USPC ......... 362/623, 624, 625, 627, 629, 607, 97.3
See application file for complete search history.

(56) References Cited

U.S. PATENT DOCUMENTS

| 5,134,549 | A | * | 7/1992 | Yokoyama | 362/623 |
| 5,477,422 | A | | 12/1995 | Hooker et al. | 362/29 |
| 6,074,070 | A | * | 6/2000 | Sasako | 362/607 |
| 6,917,473 | B2 | * | 7/2005 | Umemoto et al. | 359/599 |
| 7,325,959 | B2 | * | 2/2008 | Tsai | 362/625 |
| 7,507,012 | B2 | * | 3/2009 | Aylward et al. | 362/625 |
| 7,674,028 | B2 | * | 3/2010 | Cassarly et al. | 362/600 |
| 7,695,150 | B2 | * | 4/2010 | Dejima et al. | 362/84 |
| 7,724,320 | B2 | * | 5/2010 | Hsieh | 349/62 |
| 7,758,227 | B1 | * | 7/2010 | Coleman | 362/606 |
| 8,330,708 | B2 | * | 12/2012 | Park et al. | 345/102 |
| 2008/0117357 | A1 | * | 5/2008 | Hsieh | 349/62 |
| 2009/0016081 | A1 | * | 1/2009 | Destain | 362/625 |
| 2010/0172153 | A1 | * | 7/2010 | Ijzerman et al. | 362/612 |
| 2010/0182801 | A1 | * | 7/2010 | Ye | 362/623 |
| 2011/0194306 | A1 | * | 8/2011 | Krijn et al. | 362/607 |
| 2011/0305004 | A1 | * | 12/2011 | Kim et al. | 362/97.1 |

FOREIGN PATENT DOCUMENTS

| EP | 1 978 300 A1 | 10/2008 |
| JP | 08-227074 A | 9/1996 |
| JP | 2003-242817 A | 8/2003 |
| KR | 10-0385692 B1 | 5/2003 |
| KR | 10-2005-0055387 A | 6/2005 |
| KR | 10-0665011 B1 | 1/2007 |

OTHER PUBLICATIONS

European Search Report dated Oct. 31, 2011 issued in Application No. 11 17 9031.

* cited by examiner

*Primary Examiner* — Jong-Suk (James) Lee
*Assistant Examiner* — Bryon T Gyllstrom
(74) *Attorney, Agent, or Firm* — Ked & Associates, LLP

(57) ABSTRACT

Disclosed herein are a backlight unit and a display apparatus using the same. The backlight unit includes at least one light source, a reflection layer to reflect light emitted from the light source, and a plurality of absorption patterns formed on a portion of the reflection layer adjacent to a light emitting surface of the light source, to partially absorb the light emitted from the light source.

18 Claims, 13 Drawing Sheets

BACKLIGHT UNIT AND DISPLAY APPARATUS USING THE SAME

CROSS REFERENCE TO RELATED APPLICATION

This application claims the benefit of Korean Patent Application No. 10-2010-0108139, filed on Nov. 2, 2010, which is hereby incorporated in its entirety by reference as if fully set forth herein.

FIELD

Embodiments relate to a backlight unit and a display apparatus using the same.

BACKGROUND

Generally, representative large-scale display apparatuses include liquid crystal displays (LCDs), plasma display panels (PDPs), etc.

Unlike self-luminous type PDPs, LCDs require a separate backlight unit because they cannot generate light by themselves.

Backlight units for use in LCDs are classified into edge type backlight units and direct type backlight units according to positions of light sources. In an edge type backlight unit, light sources are arranged at left and right edges or upper and lower edges of an LCD panel and a light guide plate is provided to uniformly distribute light throughout a surface of the LCD panel. Such an edge type backlight unit ensures uniform brightness and enables production of an extremely thin display panel.

A direct type backlight unit is generally applied to displays of 20 inches or more. The direct type backlight unit advantageously has greater light efficiency than the edge type backlight unit by virtue of a plurality of light sources arranged below a panel. Accordingly, such a direct type backlight unit is mainly used in a large-scale display requiring high brightness.

Conventional edge type or direct type backlight units use cold cathode fluorescent lamps (CCFL) as light sources thereof.

Such backlight units, which use CCFLs, however, have several disadvantages, such as consumption of a great quantity of electric power because voltage should always be applied to the CCFLs, low color reproduction efficiency (about 70% that of a cathode ray tube (CRT)), and environmental pollution caused by use of mercury.

Currently, research is being conducted into backlight units using light emitting diodes (LEDs) as a solution to the above described problems.

In the case of backlight units using LEDs, turning on or off a part of an LED array is possible, so that it may be possible to achieve remarkable reduction in power consumption. In particular, RGB LEDs exhibit color reproduction exceeding a color reproduction range of 100% specified by the National Television System Committee (NTSC) and can provide more vivid images to consumers.

Further, LEDs fabricated through semiconductor processes are environmentally friendly.

Although LCD products using LEDs having the above-mentioned advantages have been introduced, these LCD products require expensive drivers, PCBs, etc. because LEDs have a driving mechanism different from conventional CCFLs.

For this reason, LED backlight units are applied only to high-price LCD products at present.

SUMMARY

In accordance with an embodiment, there is provided a backlight unit including absorption patterns formed on a reflection layer around a light source to partially absorb light, and a light shield layer having light shield patterns to partially shield light, thereby being capable of removing a hot spot phenomenon occurring around the light source and obtaining uniform brightness.

In accordance with another embodiment, there is provided a backlight unit wherein a groove is formed at a light guide plate to partially receive a light source, thereby reducing the thickness of the backlight unit.

Additional advantages, objects, and features of the embodiments will be set forth in part in the description which follows and in part will become apparent to those having ordinary skill in the art upon examination of the following or may be learned from practice of the invention. The objectives and other advantages of the embodiments may be realized and attained by the structure particularly pointed out in the written description and claims hereof as well as the appended drawings.

To achieve the objects and other advantages and in accordance with the embodiments, as broadly described herein, a backlight unit includes at least one light source, a reflection layer to reflect light emitted from the light source, and a plurality of absorption patterns formed on a portion of the reflection layer adjacent to a light emitting surface of the light source, to partially absorb the light emitted from the light source.

The at least one light source may include two or more light sources, and the absorption patterns may be arranged in groups such that the absorption pattern groups correspond to the light sources, respectively. The absorption patterns may be formed in a region spaced apart from the light source by 1 to 5 mm.

The absorption patterns may have a density decreasing with increasing interval between the absorption patterns and the light source.

The absorption patterns may have a size reduced with increasing interval between the absorption patterns and the light source, and may be arranged such that a interval between adjacent ones of the absorption patterns increases with increasing interval between the absorption patterns and the light source.

The absorption patterns may have a size, which is constant irrespective of a interval between the absorption patterns and the light source, and may be arranged such that a interval between adjacent ones of the absorption patterns increases with increasing interval between the absorption patterns and the light source. The absorption patterns may have a size reduced with increasing interval between the absorption patterns and the light source, and may be arranged such that a interval between adjacent ones of the absorption patterns is constant irrespective of the interval between the absorption patterns and the light source.

The absorption patterns in each of the absorption pattern groups arranged to respectively correspond to the light sources may be distributed in a pentagonal shape. The absorption patterns may have a circular shape, an oval shape, or a polygonal shape.

Adjacent groups of the absorption patterns respectively arranged to correspond to adjacent ones of the light sources may be spaced apart from each other by a predetermined interval.

The absorption patterns may be made of a mixture of white ink and black ink. The white ink may include at least one of a metal, $TiO_2$, $SiO_2$, $CaCO_3$, and ZnO, and the black ink may include a carbon-based material.

The black ink may have a mixing ratio of 1 to 50%.

The backlight unit may further include a light guide plate to guide light emitted from the light source, and light shield patterns supported by the light guide plate while being in contact with the light guide plate or arranged to be spaced apart from the light guide plate while defining a predetermined space between the light shield patterns and the light guide plate, to partially shield the light.

The light guide pattern may have a multilayer structure having layers made of different materials. An upper one of the layers in the light guide pattern may have a larger area than a lower one of the layers. The lower layer may have a higher reflectance than the upper layer.

The light guide plate may include at least one groove to receive a portion of the at least one light source or the entirety of the at least one light source.

It is to be understood that both the foregoing general description and the following detailed description of the embodiments are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the preferred embodiments, examples of which are illustrated in the accompanying drawings.

In the following description of the embodiments, it will be understood that, when an element such as a layer (film), region, pattern, or structure is referred to as being "on" or "under" another element, it can be "directly" on or under another element or can be "indirectly" formed such that an intervening element is also present. Also, terms such as "on" or "under" should be understood on the basis of the drawings.

Furthermore, the expression "on" or "under" may be used herein to represent the relationship of one element to another element as illustrated in the figures. It will be understood that this expression is intended to encompass different orientations of the elements in addition to the orientation depicted in the figures, namely, to encompass both "on" and "under".

Figure 1A:
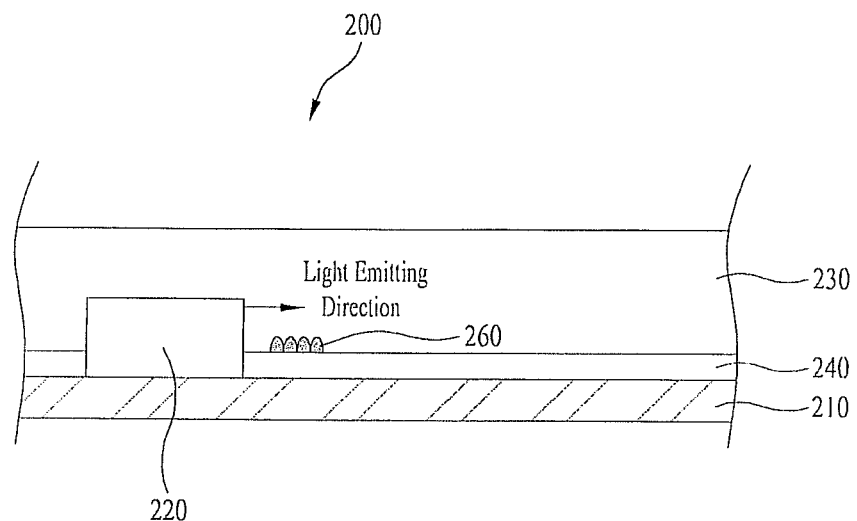
FIGS. 1A and 1B are schematic views illustrating backlight units according to exemplary embodiments, respectively.
Figure 1B:
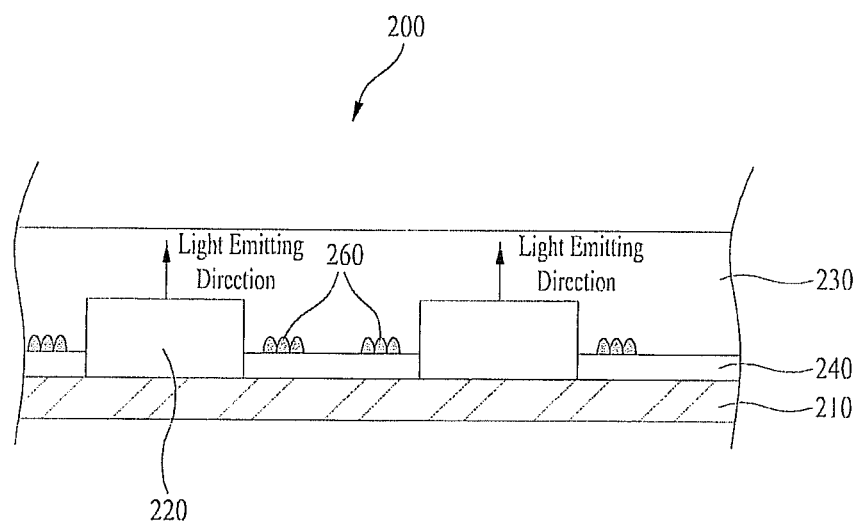

FIGS. 1A and 1B are schematic views illustrating backlight units according to exemplary embodiments, respectively. FIG. 1A illustrates a backlight unit including an edge type optical system, whereas FIG. 1B illustrates a backlight unit including a direct type optical system.

As shown in FIGS. 1A and 1B, each backlight unit, which is designated by reference numeral 200, includes a first layer 210, light sources 220, a second layer 230, a reflection layer 240, and absorption patterns 260.

The plural light sources 220 are formed on the first layer 210. The second layer 230 is also formed over the first layer 210 to encompass the plural light sources 220.

The first layer 210 may be a substrate on which the plural light sources 220 are mounted. In this case, electrode patterns (not shown) to connect the light sources 220 to an adaptor (not shown) to supply electric power may also be formed on the substrate.

For example, carbon nanotube electrode patterns (not shown) may be formed on an upper surface of the substrate to connect the light sources 220 to the adapter (not shown).

The first layer 210 may be a printed circuit board (PCB) made of polyethylene terephthalate (PET), glass, polycarbonate (PC), silicon (Si), or the like, on which the plural light sources 220 is mounted, or may take the form of a film.

Each light source 220 may be a light emitting diode (LED) chip or an LED package including at least one LED chip.

The following description associated with the illustrated embodiments will be given in conjunction with the case in which an LED package is used for each light source 220.

The LED packages, which constitute the light sources 220, may be classified into a side view type LED package and a top view type LED package in accordance with the direction of the light emitting surface thereof. The light sources 220 of FIG. 1A are side view type LED packages having light emitting surfaces to be directed to a lateral side, whereas the light sources 220 of FIG. 1B are top view type LED packages having light emitting surfaces to be directed to a top side.

In an exemplary embodiment, at least one of the side view type light source and top view type light source may be used.

In the case in which each light source 220 is a side view type LED package, the light source 220 has a light emitting surface at a side surface thereof, as shown in FIG. 1A. In this case, the light source 220 emits light in a lateral direction, namely, in an extension direction of the first layer 210 or reflection layer 240.

On the other hand, in the case in which each light source 220 is a top view type LED package, the light source 220 has a light emitting surface at a top surface, as shown in FIG. 1B. In this case, the light source 220 emits light in an upward direction, namely, in a direction toward an upper surface of the second layer 230.

Each light source 220 may include a color LED emitting light of at least one color selected from red, blue, green, etc., or a white LED.

The color LED may include at least one of red, blue, and green LEDs. Arrangement of such LEDs and colors of light emitted from the LEDs may be varied.

Meanwhile, the second layer 220, which is formed over the first layer 210 to encompass the plural light sources 220, transmits light emitted from the light sources therethrough while diffusing the light, in order to uniformly distribute the light emitted from the light sources 220 over the display panel.

The reflection layer 240 may be disposed on the first layer 210, to reflect the light emitted from the light sources 220.

The reflection layer 240 may be formed on the first layer 210 in a region other than the regions where the light sources 220 are formed.

If necessary, the reflection layer 240 may also be formed under the light sources 220.

The reflection layer 240 reflects the light emitted from the light sources 220. The reflection layer 240 also reflects light fully reflected from a boundary of the second layer 230. Thus, the reflection layer 240 may spread the light over a wider region.

The reflection layer 240 may include at least one of metals and metal oxides as reflective materials. For example, the reflection layer 240 may include a metal or a metal oxide, which has high reflectance, such as aluminum (Al), silver (Ag), or titanium dioxide ($TiO_2$).

In this case, the reflection layer 240 may be formed by depositing or coating a metal or a metal oxide on the first layer 210. Alternatively, the reflection layer 240 may be formed by printing a metal ink on the first layer 210.

For deposition, a vacuum deposition method such as a thermal deposition method, an evaporation method, or a sputtering method may be used. For coating or printing, a printing method, a gravure coating method or a silk screen method may be sued.

Meanwhile, the second layer 230, which is disposed on the first layer 210, may be made of a transmissive material, for example, silicon or acryl-based resin.

The second layer 230 may be made of various resin materials without being limited to the above-described material.

In order to allow light emitted from the light sources 220 to be diffused, and thus to enable the backlight unit 220 to exhibit uniform brightness, the second layer 230 may be made of a resin having a reflectance of about 1.4 to 1.6.

For example, the second layer 230 may be made of a material selected from the group consisting of polyethylene terephtalate (PET), polycarbonate (PC), polypropylene (PP), polyethylene (PE), polystyrene (PS), polyepoxy, silicon, and acryl.

The second layer 230 may include a polymer resin having sufficient adhesiveness to be firmly bonded to the light sources 220 and the reflection layer 240.

For example, the second layer 230 may include unsaturated polyester, methyl methacrylate, ethyl methacrylate, isobutyl methacrylate, n-butyl metacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate, and n-butyl acrylate.

The second layer 230 may be formed by coating a liquid or gel resin over the first layer 210, on which the plural light sources 220 and the reflection layer 240 are formed, and then curing the coating. Alternatively, the second layer 230 may be formed by coating a resin over a support sheet, partially curing the coating, and then bonding the coating to the first layer 210.

The second layer 230 may also function as a light guide plate to guide light emitted from the light sources 220.

The absorption patterns 260 are formed in groups on portions of the reflection layer 240 adjacent to respective light emitting surfaces of the light sources 220. The absorption patterns 260 may perform a function to partially absorb light emitted from the light sources 220.

The reason why absorption patterns 260 are formed on the reflection layer 240 in regions adjacent to the light sources 220 is as follows.

The recent tendency of backlight units is to reduce the thickness thereof, namely, to provide a slim structure. However, as the thickness of such a backlight unit is reduced, the uniformity of light emitted by the backlight unit is degraded, so that a phenomenon such as a hot spot may occur in regions adjacent to light sources.

To this end, in the illustrated embodiments, the absorption patterns 260 are provided to partially absorb light of high brightness in regions corresponding to portions of the reflection layer 240 adjacent to the light sources 220. Thus, it may be possible not only to remove a hot spot phenomenon, but also to maintain uniform brightness.

In the edge type optical system as shown in FIG. 1A, the absorption patterns 260 may be disposed to be directed to the light emitting surfaces of the light sources 220. On the other hand, in the direct type optical system as shown in FIG. 1B, the absorption patterns 260 may be disposed to encompass the light sources 220.

Where a plurality of light sources 220 are aligned together, it is preferred that the absorption patterns 260 be arranged in groups such that the absorption pattern groups correspond to the light sources 220, respectively.

Figure 2:
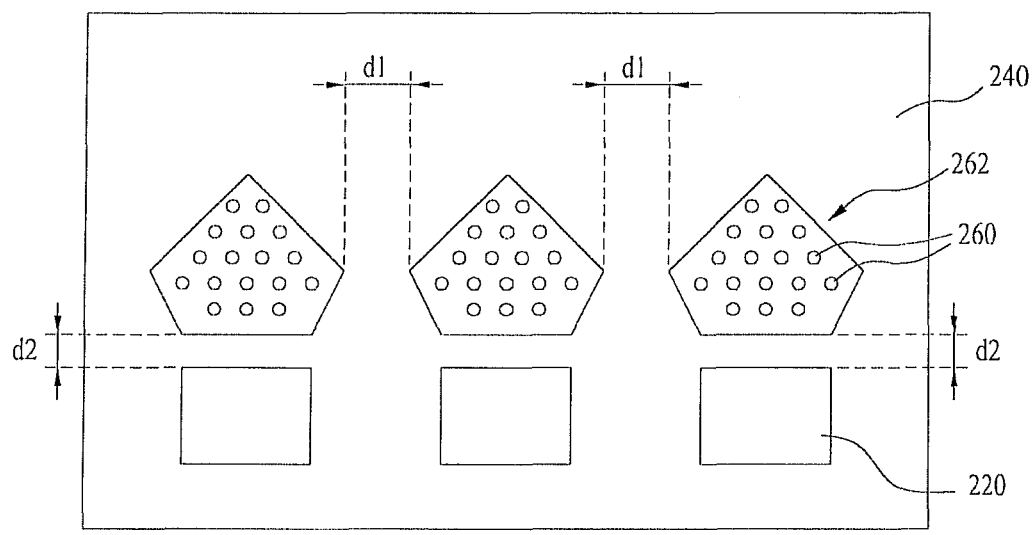
FIG. 2 is a plan view illustrating arrangement of the absorption patterns.

FIG. 2 is a plan view illustrating arrangement of the absorption patterns.

Where the light sources 220 are disposed on the reflection layer 240 so as to be aligned, as shown in FIG. 2, the absorption patterns 260 may be arranged in groups such that the absorption pattern groups correspond to respective light sources 220 while being spaced apart from the corresponding light sources 220 by a predetermined interval d2, respectively.

Here, the interval d2 is about 0.1 to 1 mm. The interval d2 may be varied in accordance with the interval between each light source 220 and a portion of the reflection layer 240 which light emitted from the light source 220 cannot reach.

Thus, each group of absorption patterns 260 may be formed in a region spaced apart from the corresponding light source 220 by a interval ranging from 1 mm to 5 mm.

As shown in FIG. 2, the absorption patterns 260 of the absorption pattern group arranged in front of each light source 220 are distributed in a pattern distribution region 262. The pattern distribution region 262 may have a pentagonal shape.

The reason why the pattern distribution region 262 has a pentagonal shape is that it is desirable for the absorption patterns 260 to be arranged in a travel direction of light emitted from the light source 220 because the light travels while spreading horizontally.

When the pattern distribution region 262, in which absorption patterns 260 are distributed, is excessively wide, brightness may be degraded. Accordingly, it is preferred that the width of the pattern distribution region 262, which represents the number of absorption patterns 260, is reduced with increasing interval between the pattern distribution region 262 and the corresponding light source 220. In this regard, the pattern distribution region 262 may have a pentagonal shape.

If necessary, the pattern distribution region 262, in which absorption patterns 260 are distributed, may have a shape other than the pentagonal shape, for example, a circular shape, an oval shape, or a polygonal shape.

Adjacent groups of absorption patterns 260 respectively arranged to correspond to adjacent ones of the light sources 220 may be spaced apart from each other by a interval d1.

This is because, when the pattern distribution regions 262, in which absorption patterns 260 are distributed, are excessively wide, the brightness of light may be degraded.

The shape of the absorption patterns 260 is not limited to a particular shape. For example, the absorption patterns 260 may have a circular shape, an oval shape, or a polygonal shape.

The density of absorption patterns 260 in each pattern distribution region 262 may be reduced with increasing interval between the absorption patterns 260 and the corresponding light source 220, without being limited thereto.

This is because the brightness of light reflected from a portion of the reflection layer adjacent to the light source 220 is higher than the brightness of light reflected from a portion of the reflection layer distant from the light source 220.

Accordingly, the number of absorption patterns 260 disposed in a region adjacent to the light source 220 may be greater than the number of absorption patterns 260 disposed in a region away from the light source 220.

Figure 3A:
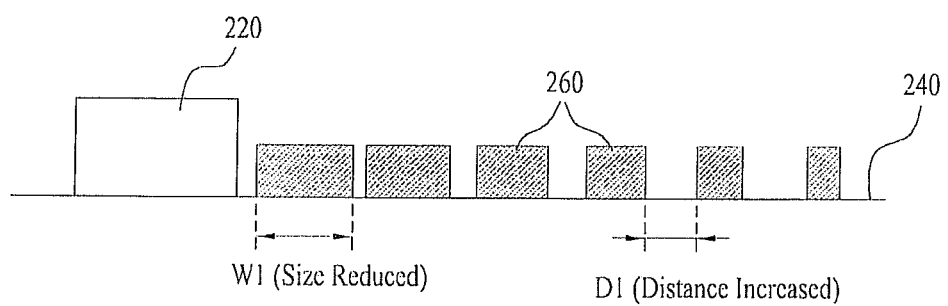
FIGS. 3A to 3C are sectional views illustrating different arrangements of absorption patterns, respectively.
Figure 3B:
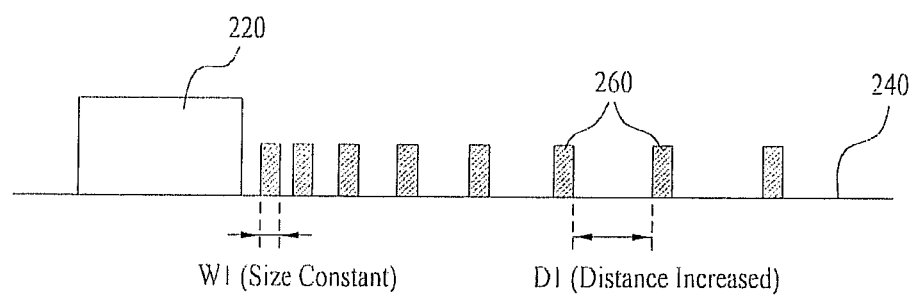
Figure 3C:
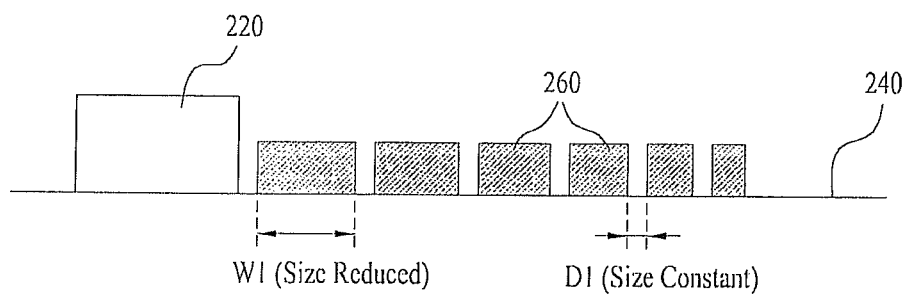

FIGS. 3A to 3C are sectional views illustrating different arrangements of absorption patterns, respectively.

In the case of FIG. 3A, the absorption patterns 260 may have a size W1, which is reduced with increasing interval between the absorption patterns 260 and the light source 220. In this case, the absorption patterns 260 may also be arranged such that the interval D1 between adjacent ones of the absorption patterns 260 increases with increasing interval between the absorption patterns 260 and the light source 220.

In the case of FIG. 3B, the absorption patterns 260 may have a size W1, which is constant irrespective of the interval between each absorption pattern 260 and the light source 220. In this case, the absorption patterns 260 may also be arranged such that the interval D1 between adjacent ones of the absorption patterns 260 increases with increasing interval between the absorption patterns 260 and the light source 220.

In the case of FIG. 3C, the absorption patterns 260 may have a size W1, which is reduced with increasing interval between the absorption patterns 260 and the light source 220. In this case, the absorption patterns 260 may also be arranged such that the interval D1 between adjacent ones of the absorption patterns 260 is constant irrespective of the interval between each absorption pattern 260 and the light source 220.

The absorption patterns 260 arranged as described above may be made of a mixture of white ink and black ink.

The white ink may be at least one of a metal, $TiO_2$, $SiO_2$, $CaCO_3$, and ZnO. The black ink may include a carbon-based material.

In the mixture of white ink and black ink, the rate of the black ink may be about 1 to 50%. The rate of the black ink may also be about 3 to 15%.

This is because, when the rate of black ink is excessively higher than the above-described reference value, a dark region may be generated in a region adjacent to the light source 220. On the other hand, when the rate of black ink is excessively lower than the reference value, a hot spot may be generated in a region adjacent to the light source 220.

Although a hot spot phenomenon may be reduced in the backlight unit, which has absorption patterns, light shield patterns may be additionally formed to obtain uniform brightness.

The light shield patterns reduce the brightness of light emitted from a region adjacent to the light source, in order to enable the backlight unit to emit light of uniform brightness.

Figure 4A:
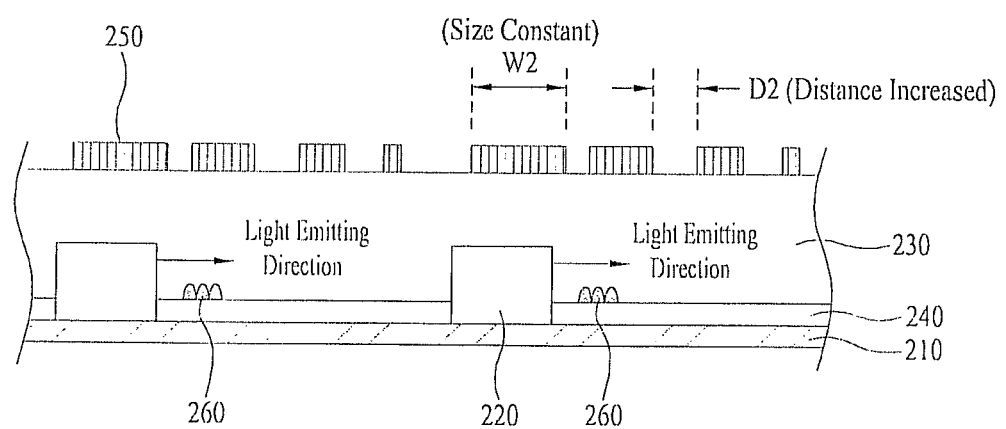
FIGS. 4A to 4C are sectional views illustrating different arrangements of light shield patterns, respectively.
Figure 4B:
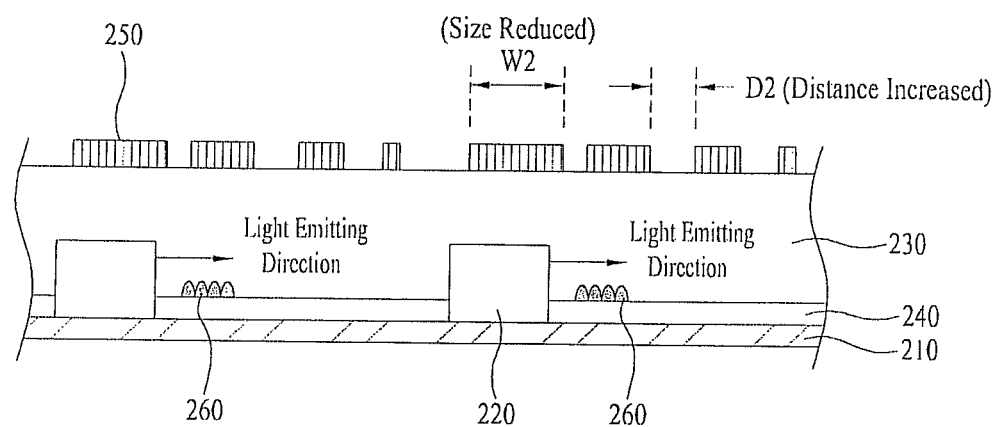
Figure 4C:
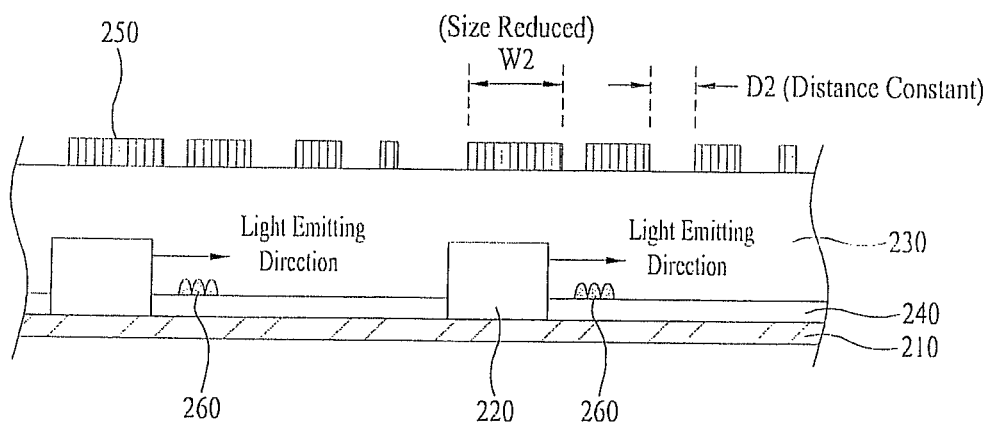

FIGS. 4A to 4C are sectional views illustrating different arrangements of light shield patterns, respectively.

As shown in FIGS. 4A to 4C, light shield patterns 250 are supported by the second layer 230 while being in contact with the second layer 230. Alternatively, the light shield patterns 250 may be spaced apart from the second layer 230 by a predetermined spacing. The light shield patterns 250 may shield a portion of light emitted from the light sources 220.

The light shield pattern 250 may have a single layer structure or a multi-layer structure.

The light shield patterns 250 may have a width, which is constant irrespective of the interval between each light shield pattern 250 and the light emitting surface of the corresponding light source 220, or is reduced with increasing interval between the light shield patterns 250 and the corresponding light source 220.

The light shield patterns 250 may also have a thickness, which is constant irrespective of the interval between each light shield pattern 250 and the light emitting surface of the corresponding light source 220, or is reduced with increasing interval between the light shield patterns 250 and the corresponding light source 220.

The light shield patterns 250 may be made of at least one of a metal, Al, $TiO_2$, $SiO_2$, $CaCO_3$, and ZnO.

Thus, the light shield patterns 250 may have a size and a density, which are varied in accordance with the interval between each light shield pattern 250 and the corresponding light source 220, in order to uniformly control brightness.

In the case of FIG. 4A, the light shield patterns 250 may have a spacing D2, which increases with increasing interval between the light shield patterns 250 and the corresponding light source 220. In this case, the light shield patterns 250 may also have a size W2, which is constant irrespective of the interval between each light shield pattern 250 and the corresponding light source 220.

In the case of FIG. 4B, the light shield patterns 250 may have a spacing D2, which increases with increasing interval between the light shield patterns 250 and the corresponding light source 220. In this case, the light shield patterns 250 may also have a size W2, which decreases with increasing interval between the light shield patterns 250 and the corresponding light source 220.

In the case of FIG. 4C, the light shield patterns 250 may have a spacing D2, which is constant irrespective of the interval between each light shield pattern 250 and the corresponding light source 220. In this case, the light shield patterns 250 may also have a size W2, which decreases with increasing interval between the light shield patterns 250 and the corresponding light source 220.

The light shield patterns 250, which are arranged as described above, may have a single layer structure or a multilayer structure, which exhibits different light transmittances at different regions thereof.

When each light shield pattern 250 has a multilayer structure, the materials of the layers thereof may be different.

Figure 5:
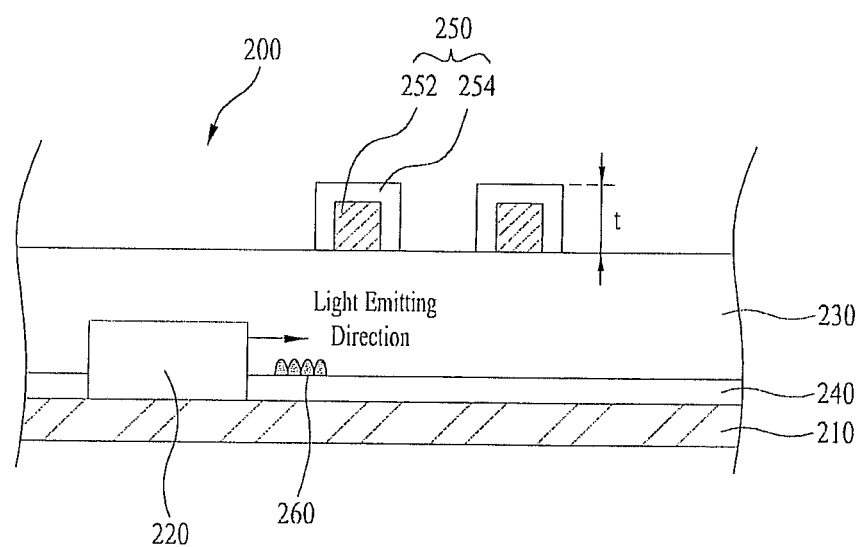
FIG. 5 is a sectional view illustrating light shield patterns having a multilayer structure.

FIG. 5 is a sectional view illustrating light shield patterns having a multilayer structure.

As shown in FIG. 5, each light shield pattern 250 may include a lower layer 252, and an upper layer 254 to cover the lower layer 252.

In this case, the light shield pattern 250 may be formed such that the upper layer 254 has a larger area than the lower layer 252.

Also, in each light shield pattern 250, the lower layer 252 exhibits a higher reflectance than the upper layer 254.

For example, the lower layer 252 of each light shield pattern 250 may include Al, whereas the upper layer 252 of the light shield pattern 250 may include $TiO_2$ or $SiO_2$.

The reason why each light shield pattern 250 is formed to have a multilayer structure, as described above, is as follows. When each light shield pattern 250 has a single layer structure, reflected light may leak around the light shield pattern 250. It may possible to scatter the light leaking around the light shield pattern 250 by constituting the light shield pattern 250 of a lower layer 252 and an upper layer 254 having a lower reflectance than the lower layer 252. In this case, accordingly, it may be possible to control brightness.

It is also preferred that the total thickness t of each light shield pattern 250 be about 3 to 5 μm.

When the thickness of each light shield pattern 250 exceeds the above-described reference value, light may be completely shielded, so that a dark region may be generated. In this case, the total thickness of the backlight unit may also be increased. On the other hand, when the thickness of each light shield pattern 250 does not exceed the reference value, light exhibits wavelength shift while passing through the light shield pattern 250, so that color variation to yellow may occur.

Figure 6A:
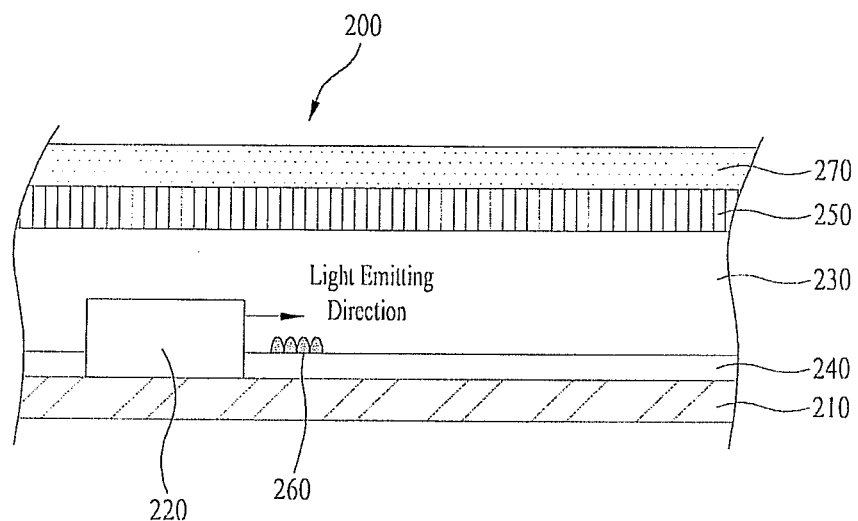
FIGS. 6A to 6C are sectional views illustrating different positions of light shield patterns, respectively.
Figure 6B:
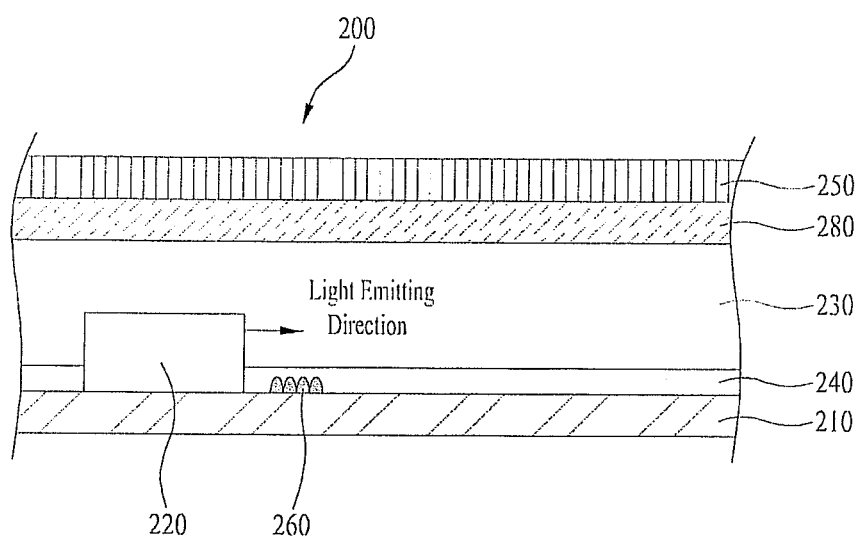
Figure 6C:
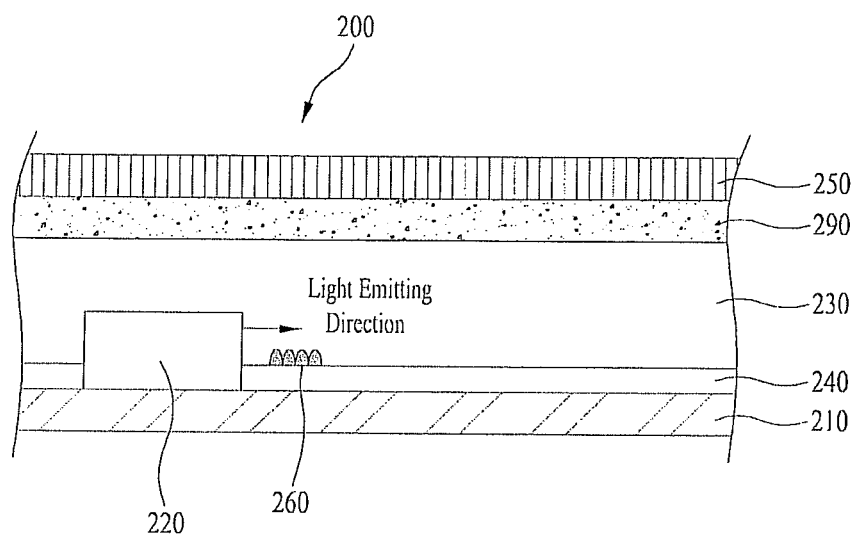

FIGS. 6A to 6C are sectional views illustrating different positions of light shield patterns, respectively.

In the case of FIG. 6A, the light shield pattern 250 may be formed beneath a diffusion layer 270.

That is, the diffusion layer 270 may be disposed over the light shield pattern 250 to upwardly diffuse light. In this case, the diffusion layer 270 may be directly bonded to the light shield pattern 250 or may be bonded to the light shield pattern 250 by a separate bonding member.

In this case, the diffusion layer 270 diffuses light incident thereupon, thereby preventing light emerging from the light shield pattern 250 from being locally concentrated. Thus, it may be possible to obtain more uniform brightness of light.

As shown in FIG. 6B, the light shield pattern 250 may be spaced apart from the second layer 230, which is made of a transmissive material, by a space 280 filled with air or gas. As shown in FIG. 6C, a buffer layer 290 may also be formed between the light shield pattern 250 and the second layer 230.

The buffer layer 290 may be the diffusion layer 270 of FIG. 6A or may be a layer having a different refractive index than the second layer 230. Alternatively, the buffer layer 290 may be an adhesive layer to enhance the bonding force between the light shield pattern 250 and the second layer or a heat absorption layer remaining after formation of the light shield pattern 250.

Figure 7:
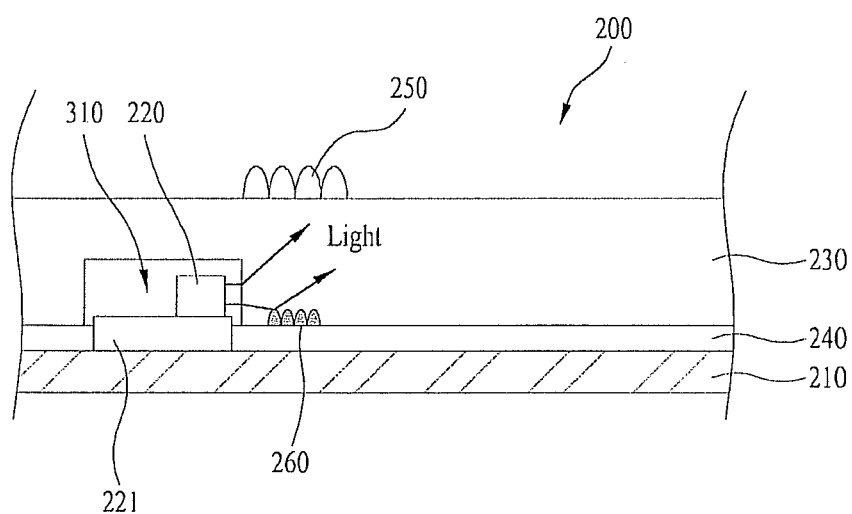
FIGS. 7 and 8 are sectional views each illustrating one light source disposed on a light guide plate.
Figure 8:
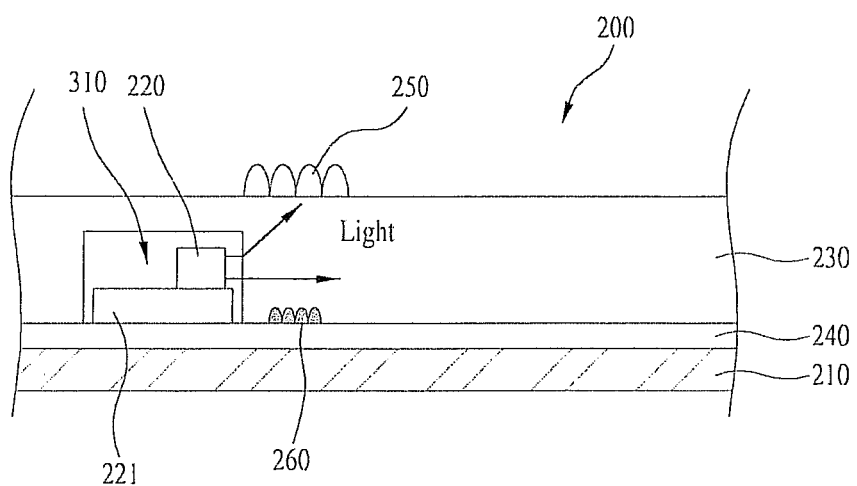

FIGS. 7 and 8 are sectional views each illustrating one light source disposed on a light guide plate.

As shown in FIGS. 7 and 8, when the second layer 230 is a light guide plate, this light guide plate may have at least one groove 310 to insert a portion of the light source or the entirety of the light source.

The groove 310 may be formed at the light guide plate to a predetermined depth in a region where the light source 220 will be disposed.

After formation of the groove 310, the light source 220 is arranged to be inserted into the groove 310. Thus, it may be possible to reduce the total thickness of the backlight unit.

As shown in FIG. 7, a support portion 221 of the light source 220 may be partially protruded from the groove 310 of the light guide plate. Alternatively, the entire portion of the light source 220 including the support portion 221 may be completely inserted into the groove 310 of the light guide plate.

Figure 9:
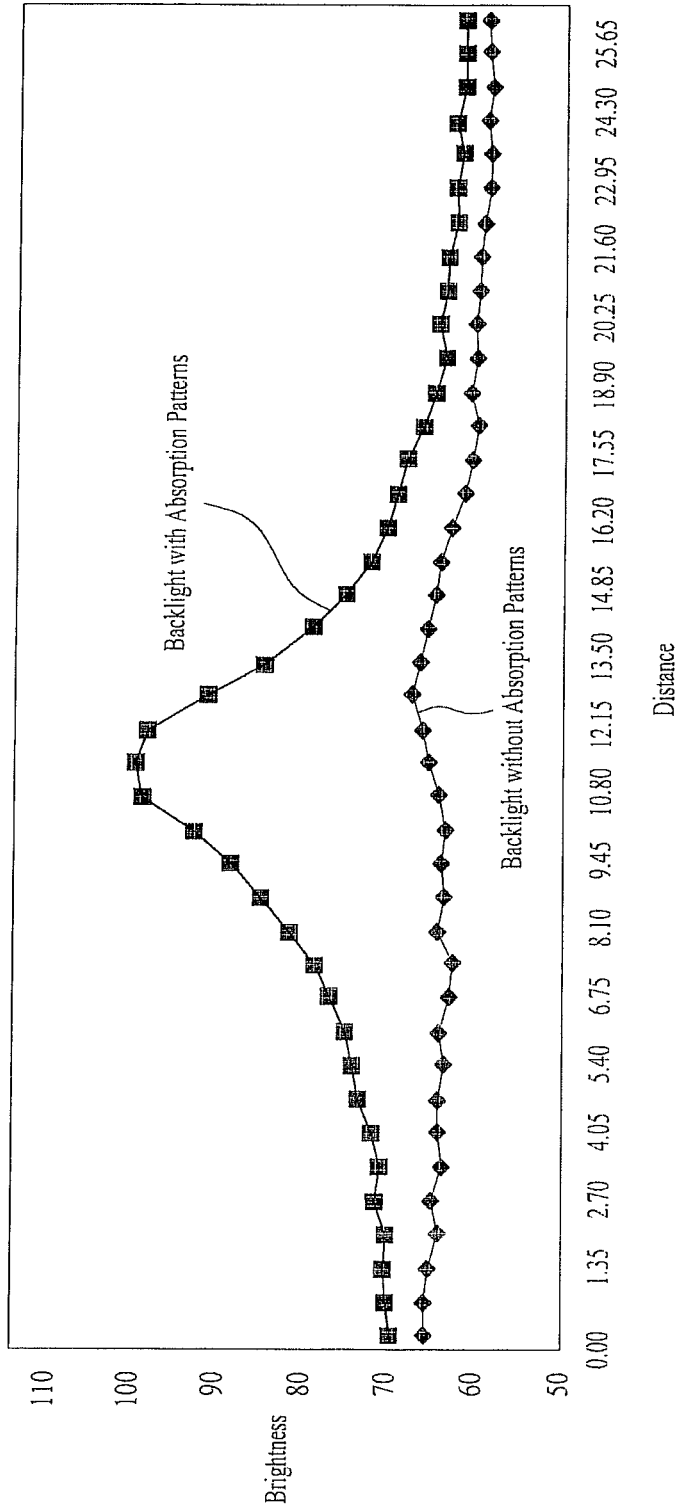
FIG. 9 is a graph depicting the brightness of the backlight unit varying depending on whether or not absorption patterns are present.

FIG. 9 is a graph depicting the brightness of the backlight unit varying depending on whether or not absorption patterns are present.

When a variation in the brightness of light depending on a variation in the interval from the light source is measured, high brightness is exhibited in a region adjacent to the light source in the case of a backlight unit having no absorption pattern, as shown in FIG. 9. On the other hand, in the case of a backlight unit having absorption patterns, uniform brightness is exhibited even in the region adjacent to the light source, as shown in FIG. 9.

In the backlight unit, which has absorption patterns, there is no hot spot phenomenon occurring in the region adjacent to the light source. In this case, it may also be possible to obtain uniform brightness throughout the backlight unit.

That is, the absorption patterns, which are formed on the reflection layer around the light source, partially absorb light, thereby removing a hot spot phenomenon occurring around the light source. The absorption patterns may also provide uniform brightness.

In one exemplary embodiment as described above, light shield patterns, each of which has a multilayer structure, are formed around respective light sources, to adjust the transmittance of light. Accordingly, it may be possible to reduce the transmittance of light in a region adjacent to the light source while minimizing color variation of the transmitted light.

In one exemplary embodiment, each light source is partially inserted into a corresponding one of the grooves formed at the light guide plate. Accordingly, it may be possible to reduce the total thickness of the backlight unit.

Figure 10:
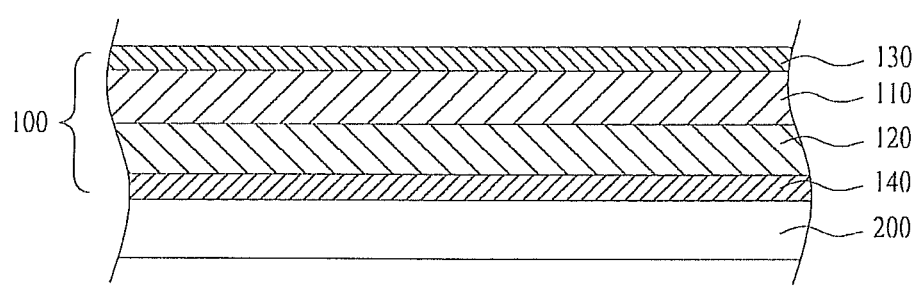
FIG. 10 is a sectional view illustrating a display module having the backlight unit according to one of the above-described embodiments.

FIG. 10 is a sectional view illustrating a display module having the backlight unit according to one of the above-described embodiments.

As shown in FIG. 10, the display module 20 may include a display panel 100 and a backlight unit 200.

The display panel 100 may include a color filter substrate 110 and a thin film transistor (TFT) substrate 120, which are assembled to face each other while defining a uniform cell gap therebetween. A liquid crystal layer (not shown) may be interposed between the two substrates 110 and 120.

An upper polarizing plate 130 and a lower polarizing plate 140 may be disposed on upper and lower surfaces of the display panel 100, respectively. In detail, the upper polarizing plate 130 is disposed on an upper surface of the color filter substrate 110, whereas the lower polarizing plate 140 is disposed on a lower surface of the TFT substrate 120.

Although not shown, gate and data drivers may be provided at a side surface of the display panel 100, in order to generate drive signals for driving the panel 100.

Figure 11:
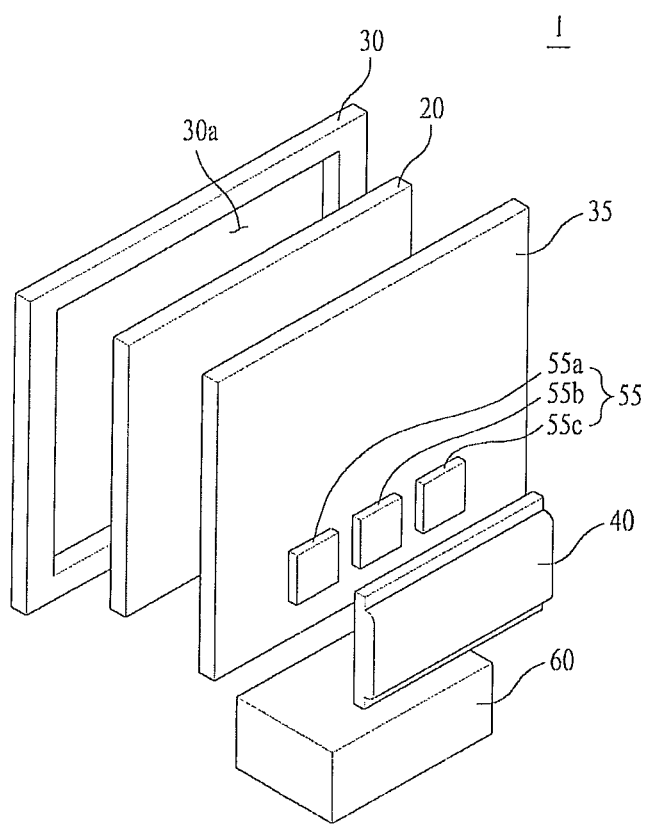
FIGS. 11 and 12 are exploded perspective views each illustrating a display apparatus according to an exemplary embodiment.
Figure 12:
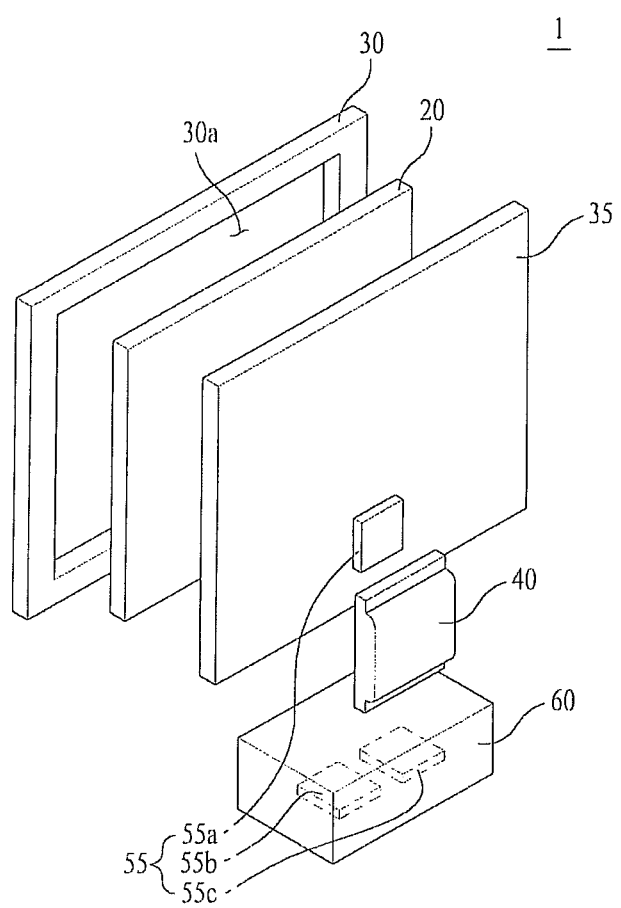

FIGS. 11 and 12 are exploded perspective views each illustrating a display apparatus according to an exemplary embodiment.

Referring to FIG. 11, the display apparatus, which is designated by reference numeral 1, includes a display module 20, front and back covers 30 and 35 for surrounding the display module 20, a driver unit 55 mounted to the back cover 35, and a driver cover 40 for surrounding the driver unit 55.

The front cover 30 may include a front panel (not shown) made of a transparent material to transmit light therethrough. The front panel is spaced apart from the display module 20 to protect the display module 20. The front panel also transmits light emitted from the display module 20, thereby allowing an image displayed by the display module 20 to be displayed to the outside of the display module 20.

The back cover 35 is coupled to the front cover 30 to protect the display module 20.

The driver unit 55 may be disposed on one surface of the back cover 35.

The driver unit 55 may include a drive controller 55a, a main board 55b, and a power supplier 55c.

The drive controller 55a may be a timing controller. The driver controller 55a is a driver to control operation timing of each driver IC included in the display module 20. The main board 55b is a driver for transferring V-sync, H-sync, and R, G, and B resolution signals to the timing controller. The power supplier 55c is a driver for applying electric power to the display module 20.

The driver unit 55 may be mounted to the back cover 35, and may be surrounded by the driver cover 40.

A plurality of holes is provided at the back cover 35, to connect the display module 20 and the driver unit 55. A stand 60 to support the display apparatus 1 may be provided.

On the other hand, as shown in FIG. 12, the drive controller 55a of the driver unit 55 may be provided at the back cover 35. The main board 55b and power supplier 55c may be provided at the stand 60.

The driver cover 40 may surround only the driver 55, which is provided at the back cover 35.

Although the main board 55b and power supplier 55c are separately provided in the illustrated embodiment, they may be integrated on a single board, without being limited thereto.

In the above-described embodiments, absorption patterns may be formed on the reflection layer around each light source to partially absorb light. Accordingly, it may be possible to remove a hot spot phenomenon and to provide light of uniform brightness.

In the above-described embodiments, light shield patterns having a multilayer structure may be formed around each light source to adjust the transmittance of light. Accordingly, it may be possible to reduce the transmittance of light in a region adjacent to each light source, and to minimize color variation of the transmitted light.

In the above-described embodiments, each light source may be partially inserted into a corresponding one of the grooves formed at the light guide plate. Accordingly, it may be possible to reduce the total thickness of the backlight unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus comprising:
a first layer;
a second layer;
a plurality of light sources between the first layer and the second layer;
a reflection layer between the first layer and the second layer; and
a plurality of absorption patterns formed on a portion of the reflection layer adjacent to the light source, wherein the plurality of absorption patterns absorb partial light emitted from the plurality of light sources,
wherein an upper surface of the reflection layer faces the second layer, and a bottom surface of the reflection layer faces the first layer,
the plurality of light sources are disposed on the upper surface of the reflection layer in a first direction,
the absorption patterns are divided into a plurality of absorption pattern groups,
the plurality of absorption pattern groups are disposed on the upper surface of the reflection layer in the first direction parallel to the plurality of light sources,
the plurality of absorption pattern groups correspond to the plurality of light sources in a one-to-one ratio,
each of the plurality of absorption pattern groups is spaced from a corresponding one of the light sources by a first interval in a second direction,
the adjacent absorption pattern groups are spaced apart from each other by a second interval in the first direction, and
the adjacent light sources are spaced apart from each other by a third interval in the first direction,
wherein the first interval is shorter than the second interval, the first interval is shorter than the third interval, and the second interval is shorter than the third interval.

2. The display apparatus according to claim 1, wherein the first interval is 0.1 mm to 1 mm.

3. The display apparatus according to claim 1, wherein the absorption patterns have a density that decreases with increasing interval between the absorption patterns and the light source.

4. The display apparatus according to claim 1, wherein the absorption patterns have a size that reduces with increasing interval between the absorption patterns and the light source, and the absorption patterns are arranged such that an interval between adjacent ones of the absorption patterns increases with increasing interval between the absorption patterns and the light source.

5. The display apparatus according to claim 1, wherein the absorption patterns have a size, which is constant irrespective of an interval between the absorption patterns and the light source, and the absorption patterns are arranged such that an interval between adjacent ones of the absorption patterns increases with increasing interval between the absorption patterns and the light source.

6. The display apparatus according to claim 1, wherein the absorption patterns have a size that reduces with increasing interval between the absorption patterns and the light source, and the absorption patterns are arranged such that an interval between adjacent ones of the absorption patterns is constant irrespective of the interval between the absorption patterns and the light source.

7. The display apparatus according to claim 1, wherein the absorption patterns in each of the absorption pattern groups are arranged in a separate pentagonal shape.

8. The display apparatus according to claim 1, wherein the absorption patterns are made of a mixture of white ink and black ink.

9. The display apparatus according to claim 8, wherein the white ink comprises at least one selected from the group consisting of a metal, $TiO_2$, $SiO_2$, $CaCO_3$, and ZnO, and the black ink comprises a carbon-based material.

10. The display apparatus according to claim 8, wherein the black ink has a mixing ratio of 1% to 50%.

11. The display apparatus according to claim 1, further comprising:
a light guide plate to guide light emitted from the light source; and
light shield patterns supported by the light guide plate while being in contact with the light guide plate or arranged to be spaced apart from the light guide plate while defining a predetermined space between the light shield patterns and the light guide plate, the light shield patterns to partially shield the light.

12. The display apparatus according to claim 11, wherein the light shield pattern has a multilayer structure having layers made of different materials.

13. The display apparatus according to claim 12, wherein an uppermost layer in the light shield pattern has a larger area than a lowermost layer in the light shield pattern.

14. The display apparatus according to claim 12, wherein a lowermost layer in the light shield pattern has a higher reflectance than an uppermost layer in the light shield pattern.

15. The display apparatus according to claim 12, wherein a lowermost layer in the light shield pattern is made of aluminum (Al), and an uppermost layer in the light shield pattern is made of $TiO_2$ or $SiO_2$.

16. The display apparatus according to claim 12, wherein the light shield patterns have a total thickness of 3 μm to 5 μm.

17. The display apparatus according to claim 11, wherein the light guide plate includes at least one groove to receive a portion of the at least one light source or an entirety of the at least one light source.

18. The display apparatus according to claim 1, wherein a total number of the plurality of absorption pattern groups is the same as a total number of the plurality of light sources.

* * * * *